Figure 1:
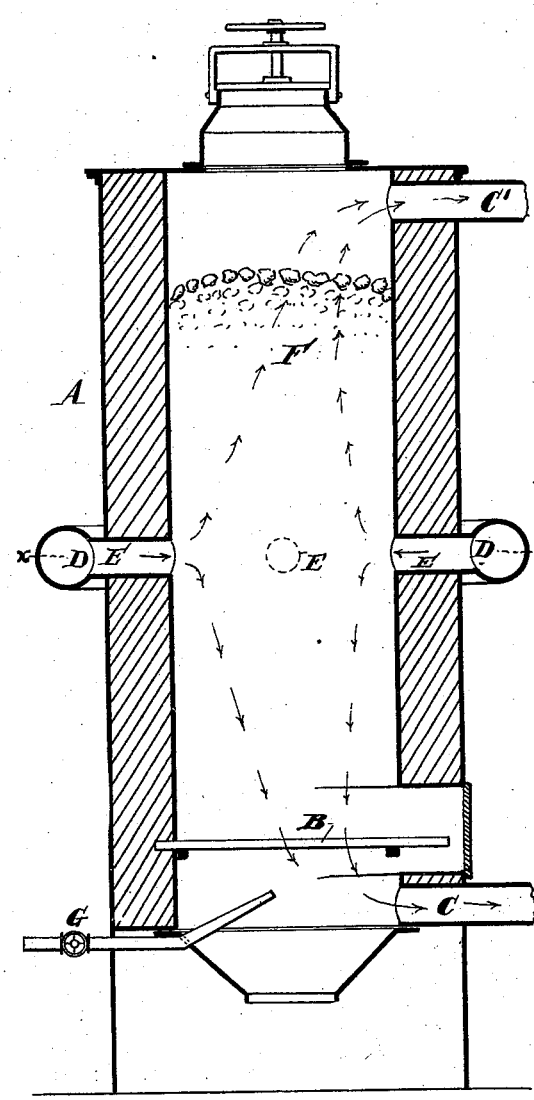

(No Model.)

W. CLARK.
PROCESS OF MANUFACTURING WATER GAS.

No. 466,323. Patented Jan. 5, 1892.

WITNESSES:

INVENTOR
Walton Clark
by his attorney
Francis T. Chambers

United States Patent Office.

WALTON CLARK, OF PHILADELPHIA, PENNSYLVANIA, ASSIGNOR, BY MESNE ASSIGNMENTS, TO THE UNITED GAS IMPROVEMENT COMPANY, OF SAME PLACE.

PROCESS OF MANUFACTURING WATER-GAS.

SPECIFICATION forming part of Letters Patent No. 466,323, dated January 5, 1892.

Application filed November 5, 1888. Serial No. 289,955. (No model.)

*To all whom it may concern:*

Be it known that I, WALTON CLARK, of the city and county of Philadelphia, State of Pennsylvania, have invented a new and useful Improvement in the Process of Manufacturing Water-Gas, of which the following is a true and exact description, reference being had to the accompanying drawings, which form a part of this specification.

My invention relates to the process of manufacturing water-gas or mixtures of water-gas with coal or other gases, and has for its object to render the preliminary blowing up of the charge of fuel in the generator to a state of incandescence prior to the admission of the steam more rapid and economical.

Heretofore the general practice has been to cause the air-blast to traverse the charge of fuel in one direction, and where the charge was of considerable depth, as it must be for efficient use in producing water-gas, the carbonic-acid gas produced in the part of the charge where the air first enters it was largely reduced to carbonic oxide in passing through the deep fuel-bed with the result of an incomplete combustion. This has attracted attention of gas-engineers and has been sought to avoid it by building comparatively shallow beds of fuel in two connected generators, blowing them up independently, and then causing the steam to pass down through one bed of fuel and up through the other. There are, however, drawbacks to this method which have prevented its general adoption. I have discovered that a very complete combustion and rapid ignition can be attained with deep charges of fuel by causing the air used in heating up the generator to enter at or about the center of the charge and pass in opposite directions through the upper and lower portion of the charge, respectively, the products of combustion issuing from the generator through exit-passages provided at its top and bottom, or the obviously equivalent method may be pursued, which consists in causing the air to enter the generator at the top and bottom thereof and pass down through the upper part of the charge and upward through the lower part thereof to a substantially central zone, where the products of combustion are drawn off. The charge being thus ignited by causing the air to pass in opposite directions through the upper and lower parts thereof, the water-gas is generated in the usual way, the air being shut off and the steam passed through the whole mass of the highly-ignited charge in one direction. It is obvious that the air used in heating up the generator may be made to pass through it either by some form of blower connected with the inlets or some form of exhauster connected with the outlets for the products of combustion.

Figure 2:
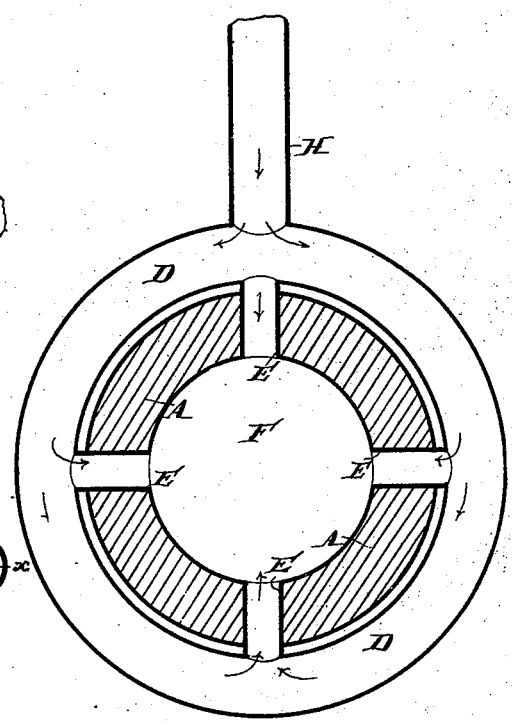
Figure 3:
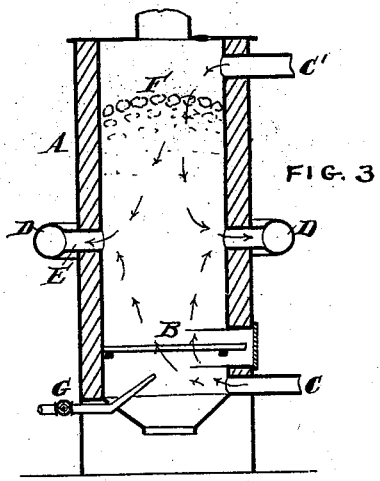

In the accompanying drawings I have illustrated a generator especially adapted for carrying out my improved process, Figure 1 being a central sectional elevation, Fig. 2 a cross-section at $x\,x$ of Fig. 1, and Fig. 3 showing the alternative mode of using my process.

A is the generator, B the grate supporting the charge, and C and C' pipes serving either the purpose of air-pipes or of exit-passages for gases.

D is a ring of pipe shown as connected with a conduit H and having branches E leading to the inside of the generator at or about the plane which would pass through the center of a full charge of fuel. These pipes, like C C', can be used either as air-pipes or as gas-exit passages.

F indicates the charge of fuel, and G is a steam-pipe.

In Fig. 1 I have indicated by the arrows the entrance of the air through pipes E, its passage upward and downward through the charge, and the escape of the products of combustion through pipes C C', and in Fig. 3 the opposite course is indicated, the air entering through pipes C C' and passing upward and downward through the charge, the gases escaping through pipes E at the central zone. In both cases when the charge is sufficiently well ignited the conduit leading from the pipes E should be closed and the steam introduced at the top or bottom of the charge and forced through its whole depth, the resulting water-gas being drawn off as through pipes C or C'.

Having now described my invention, what I claim as new, and desire to secure by Letters Patent, is—

The process of making gas, which consists in first blowing up the fire in the generator by forcing air simultaneously in opposite directions through the upper and lower parts of the charge of fuel, thereby bringing the entire charge to a preliminary high state of incandescence, and then effecting the decomposition of water and the formation of carbonic oxide and hydrogen by causing steam to traverse the entire charge of fuel, all substantially as and for the purposes specified.

WALTON CLARK.

Witnesses:
C. F. GUMMEY, Jr.,
FRANCIS T. CHAMBERS.